(12) United States Patent
Maeda et al.

(10) Patent No.: US 7,397,839 B2
(45) Date of Patent: Jul. 8, 2008

(54) OFDM COMMUNICATION SYSTEM AND METHOD

(75) Inventors: Noriyuki Maeda, Yokohama (JP); Hiroyuki Atarashi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 627 days.

(21) Appl. No.: 11/041,231

(22) Filed: Jan. 25, 2005

(65) Prior Publication Data
US 2005/0185725 A1 Aug. 25, 2005

(30) Foreign Application Priority Data
Jan. 27, 2004 (JP) ............... 2004-018772

(51) Int. Cl.
*H04B 1/69* (2006.01)
*H04J 11/00* (2006.01)

(52) U.S. Cl. ............... 375/141; 375/146; 375/147; 370/208

(58) Field of Classification Search ............... 375/130, 375/140, 141, 149, 145–147, 260; 370/208, 370/210, 211, 335, 342, 441
See application file for complete search history.

(56) References Cited

U.S. PATENT DOCUMENTS

| 7,180,932 | B1 * | 2/2007 | Heinila et al. ............... 375/147 |
| 2002/0057730 | A1 * | 5/2002 | Karlsson et al. ............. 375/152 |
| 2003/0053413 | A1 * | 3/2003 | Sawahashi et al. .......... 370/208 |
| 2004/0228267 | A1 * | 11/2004 | Agrawal et al. ............. 370/203 |
| 2004/0252629 | A1 | 12/2004 | Hasegawa et al. |
| 2004/0264548 | A1 | 12/2004 | Miyoshi |
| 2005/0141598 | A1 * | 6/2005 | Akita ......................... 375/148 |

FOREIGN PATENT DOCUMENTS

| EP | 1 158 709 A1 | 11/2001 |
| EP | 1 363 434 A2 | 11/2003 |
| EP | 1 560 359 A1 * | 8/2005 |
| JP | 7-221700 | 8/1995 |
| JP | 10-210002 | 8/1998 |
| JP | 2000-295198 | 10/2000 |
| JP | 2001-28557 | 1/2001 |

(Continued)

OTHER PUBLICATIONS

Noriyuki Maeda, et al., "Variable Spreading Factor-OFCDM with Two Dimensional Spreading that Prioritizes Time Domain Spreading for Forward Link Broadband Wireless Access", 57th IEEE Semiannual Vehicular Technology Conference, vol. 1, XP-002328610, 2003, pp. 127-132.

*Primary Examiner*—Tesfaldet Bocure
(74) *Attorney, Agent, or Firm*—Oblon, Spivak, McClelland, Maier & Neustadt, P.C.

(57) ABSTRACT

A transmitter used in a wireless communication system based on an orthogonal frequency division multiplexing (OFDM) scheme includes a determination unit that determines a spreading factor and an amplitude for a control channel based on at least one of signal quality information and interference information in data transmission. The transmitter also includes a multiplexing unit that multiplexes a data channel with the control channel having been code-spread based on the spreading factor and the amplitude. A modulator then modulates the multiplexed signal in the OFDM scheme for transmission as OFDM symbols.

9 Claims, 11 Drawing Sheets

FOREIGN PATENT DOCUMENTS

| | | |
|---|---|---|
| JP | 2001-144724 | 5/2001 |
| JP | 2003-46474 | 2/2003 |
| JP | 2003-304218 | 10/2003 |
| WO | WO 03/061170 A1 | 7/2003 |
| WO | WO 03/088539 A1 | 10/2003 |

* cited by examiner

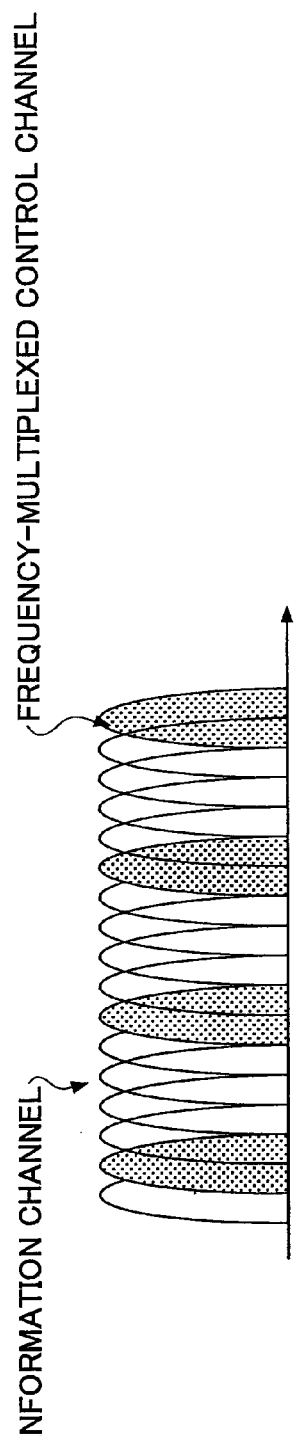
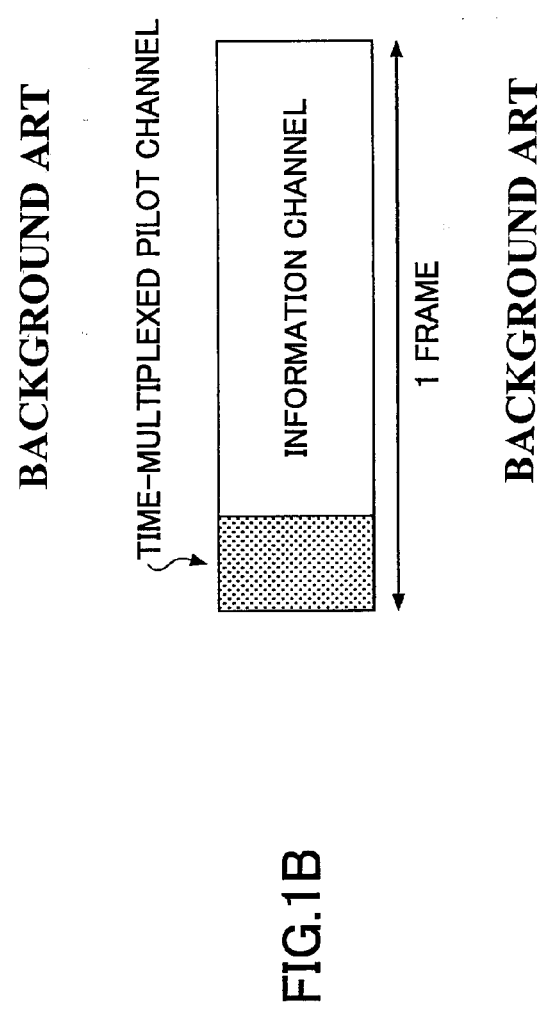
FIG.1A BACKGROUND ART
FIG.1B BACKGROUND ART

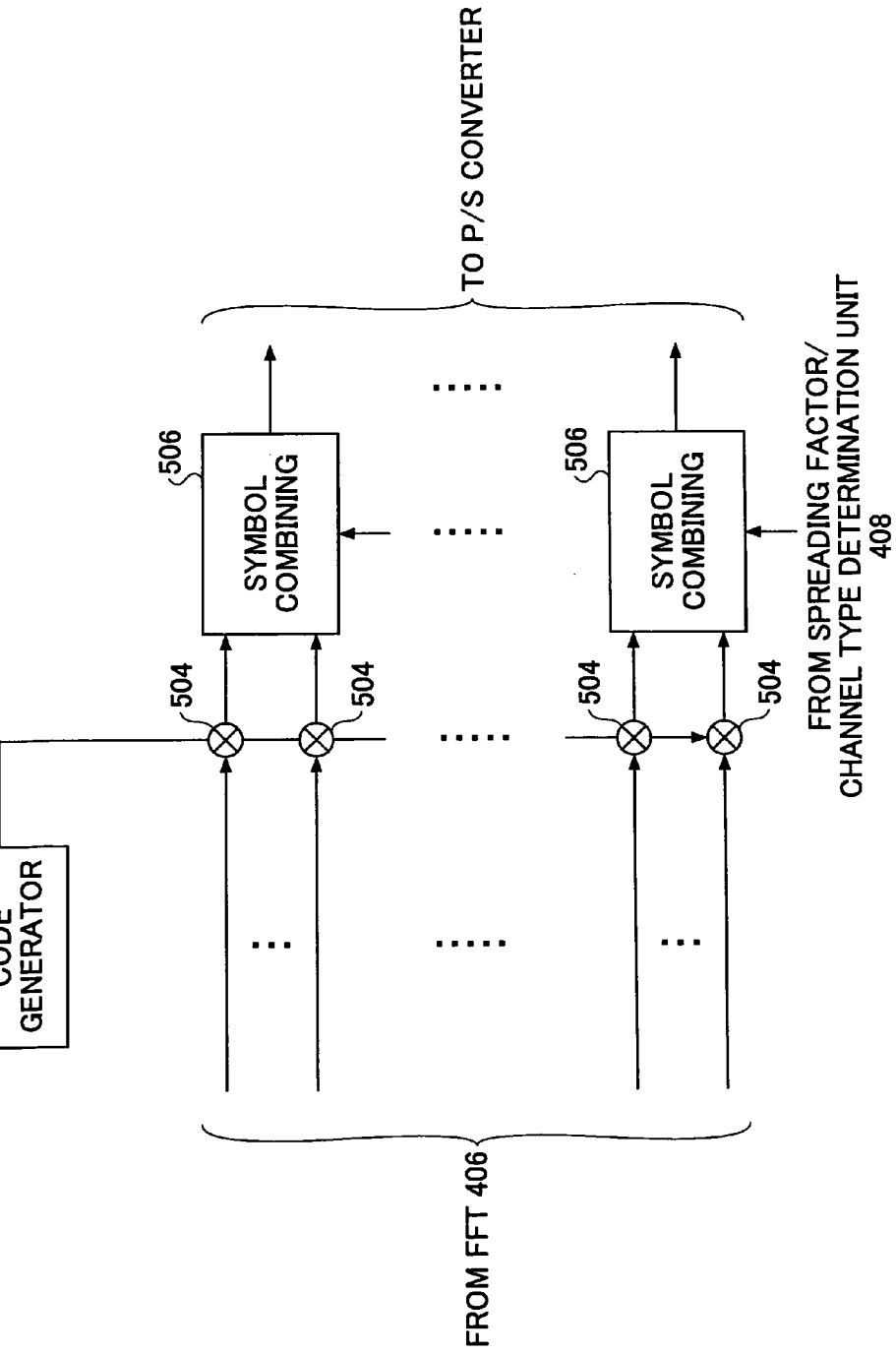

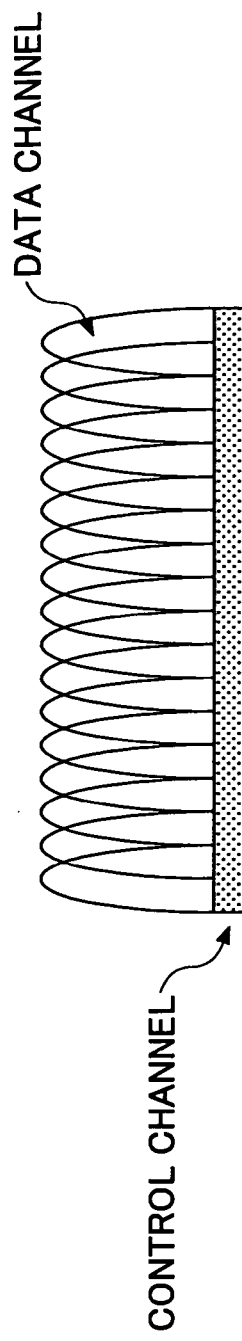
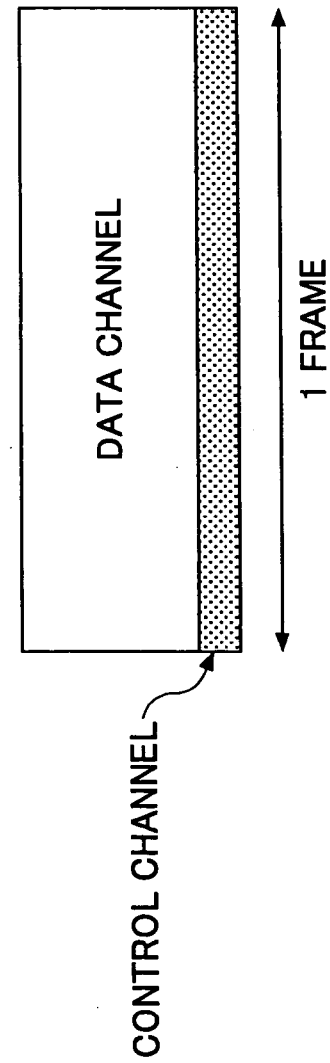
FIG.6A
FIG.6B

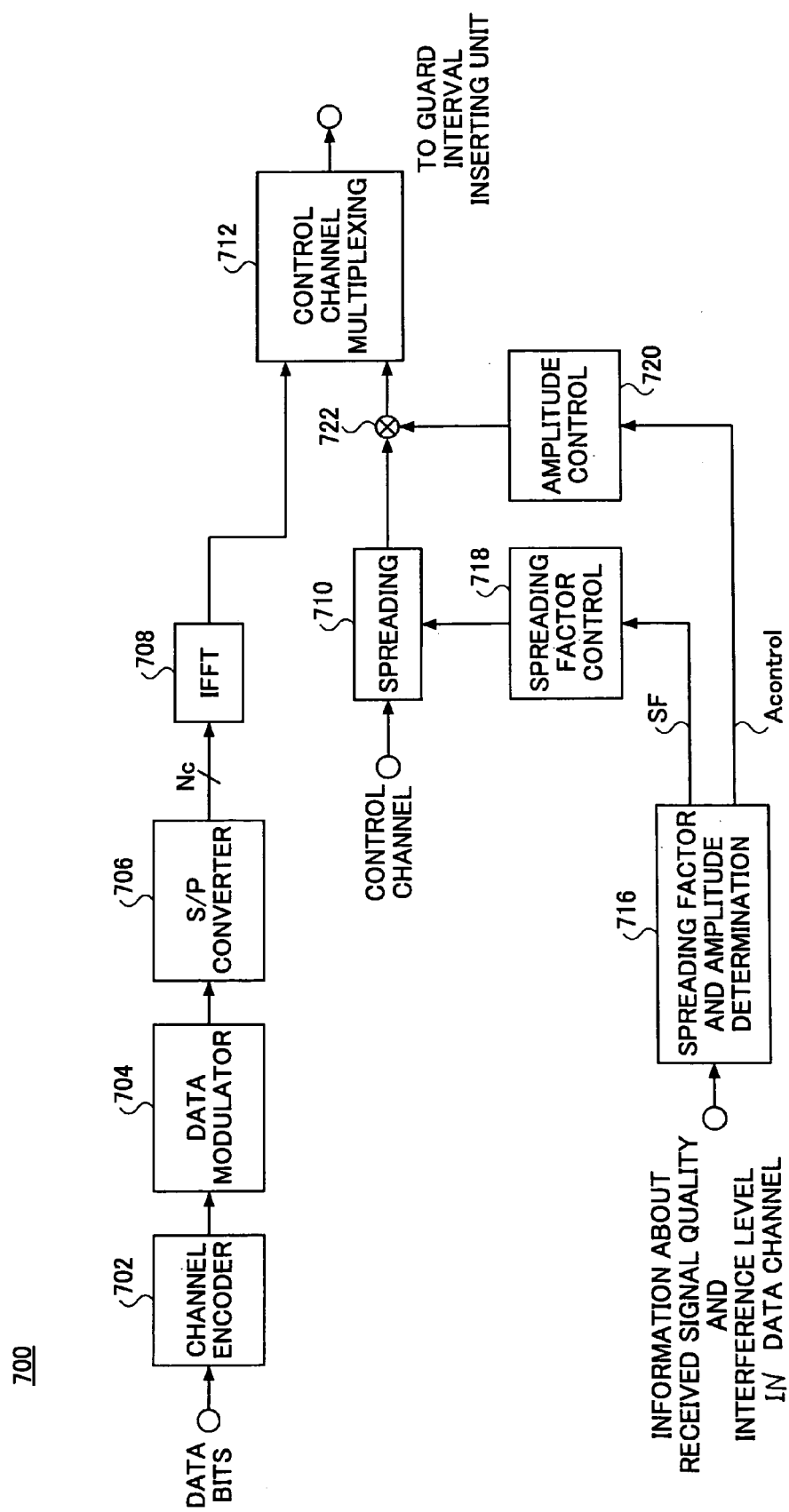

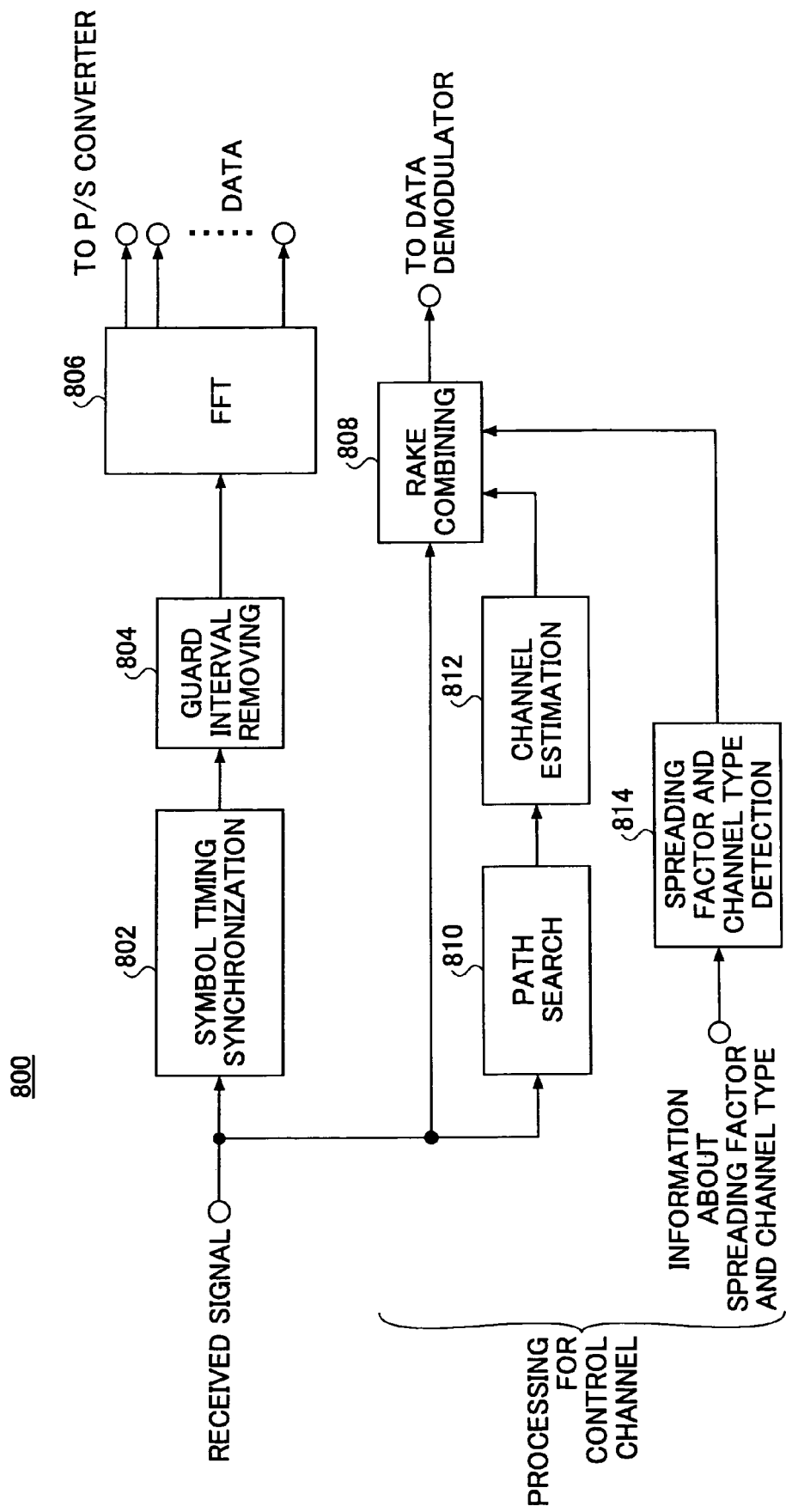

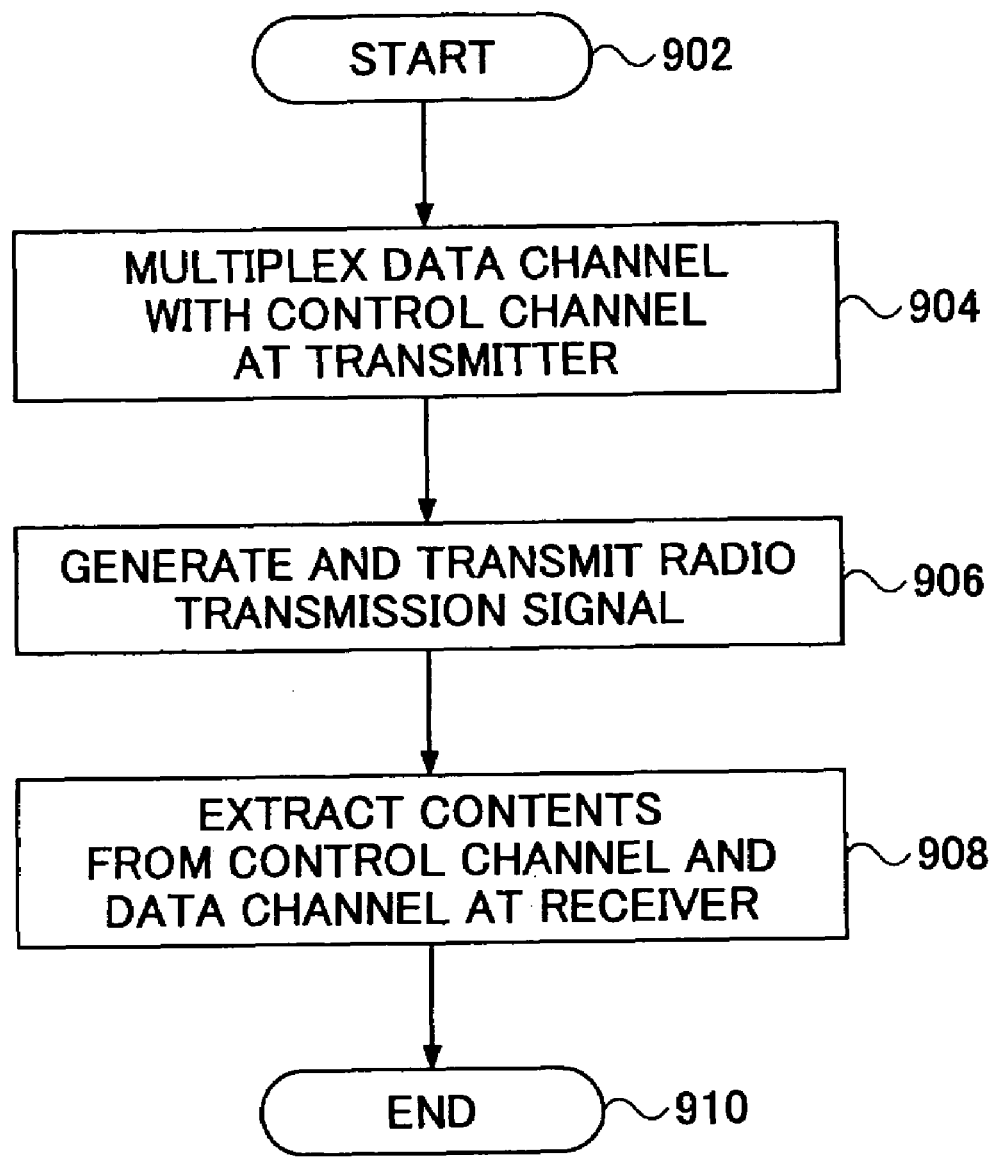

OFDM COMMUNICATION SYSTEM AND METHOD

FIELD OF THE INVENTION

The present invention generally relates to wireless communication, and more particularly, to an orthogonal frequency division multiplexing (OFDM) transmission technique and a transmitter and a receiver used in OFDM communication.

BACKGROUND OF THE INVENTION

OFDM transmission is a promising access scheme in the field of wireless communication because of the advantageous features in the multipath propagation environment. In OFDM transmission, a data channel (or a sequence of symbols) to be transmitted is associated with multiple subcarriers selected so as to be orthogonal to each other, and is subjected to inverse Fourier transform and application of a guard interval, prior to being transmitted as OFDM symbols. At the receiving end, the guard interval is removed from the received signal, and Fourier transform is performed to extract information from each of the subcarriers. Then, the transmitted data channel is recovered.

The wireless receiver receives a control channel, as well as the data channel. The control channel includes a pilot channel containing priori known symbols, a common control channel used to transmit common information to all wireless receivers in the system, and an individual control channel used to transmit an individual data item to a wireless receiver. Dedicated resources are allocated to the control channel, which control channel is multiplexed with the OFDM symbols transmitted from the wireless transmitter. The wireless receiver extracts the control channel, including the pilot channel, from the received OFDM symbols, and performs channel estimation and securing of synchronization timing. This type of wireless transmission using an OFDM scheme is described in JP 2001-144724A.

FIG. 1A and FIG. 1B are schematic diagrams illustrating a control channel multiplexed with a data channel. In FIG. 1A, the control channel is frequency-multiplexed with the data channel by allocating a certain band of the spectrum. In FIG. 1B, the control channel is time-multiplexed with the data channel by allocating a certain time slot to the pilot channel.

It will be more and more required for this field of technology to catch up with the increasing moving speed of mobile terminals, expansion of the available frequency band, and shift to higher ranges of frequency, from the viewpoint of providing high-quality services. Accordingly, it is required to provide communication services capable of sufficiently meeting a rapid change in the signal level along the time and frequency axes occurring in the communication environment.

As illustrated in FIG. 1A and FIG. 1B, a control channel (such as a pilot channel) is inserted only in a specific domain along the frequency axis or the time axis. For this reason, if the signal level abruptly changes in a domain in which the pilot channel is not inserted, satisfactory channel estimation cannot be performed. In this case, the function and the objective of the pilot channel cannot be achieved sufficiently. This means that the resources allocated to that control channel are not being efficiently used.

In addition, since dedicated resources are allocated to the control channel, the resources to be allocated to the data channel decreases. If the resources dedicatedly allocated to the control channel cannot be used efficiently, allocating the dedicated resources to the control channel, while decreasing the resources to be allocated to the other channels, becomes meaningless.

SUMMARY OF THE INVENTION

Therefore, it is an object of the present invention to solve the above-described problems in the prior art, and to provide an OFDM wireless transmission technique capable of achieving efficient use of the resources allocated to the data channel and the control channel.

In the present invention, a wireless communication system based on an orthogonal frequency division multiplexing (OFDM) scheme is provided. The system includes a transmitter and a receiver.

In one aspect of the invention, a transmitter used in the FODM communication system comprises:

(a) a determination unit configured to determine a spreading factor and an amplitude for a control channel based on at least one of signal quality information and interference information in data transmission;

(b) a multiplexing unit configured to multiplex a data channel with the control channel having been code-spread based on the spreading factor and the amplitude; and (c) means configured to modulate the multiplexed signal in the OFDM scheme and transmit the modulated signal as OFDM symbols.

In a preferred example, the transmitter further includes a spreading unit configured to code-spread the control channel in a multi-carrier code division multiple access (MC-CDMA) scheme.

With this example, the control channel is inserted continuously over a wide range of the frequency domain, and consequently, channel estimation can be performed correctly over the entire range even if an abrupt change in signal level occurs in the frequency domain.

In another example, the transmitter further includes a spreading unit configured to code-spread the control channel in a direct sequence-code division multiple access (DS-CDMA) scheme.

With this example, the control channel is inserted continuously over the entire frame in the time domain, and consequently, channel estimation can be correctly performed even if an abrupt change in signal level occurs in the time domain.

In still another example, the transmitter is applied to a wireless base station in an isolated cell. In the isolated cell, transmitting the data channel without code spreading, while transmitting the code-spread control channel, becomes advantageous.

In yet another example, the determination unit regulates the spreading factor and the amplitude such that the influence of the control channel on the data channel is smaller than a prescribed level.

With this arrangement, the code-spread control channel can be multiplexed with the data channel so as not to prevent recovery of the data channel.

In yet another example, information representing the spreading factor and the amplitude of the code-spread control channel is transmitted to a receiver.

This arrangement allows the receiver to recover the control channel promptly from the received signal.

BRIEF DESCRIPTION OF THE DRAWINGS

Other objects, features, and advantages of the invention will become more apparent from the following detailed description when read in conjunction with the accompanying drawings, in which FIG. 1A and FIG. 1B are schematic diagrams illustrating a pilot channel multiplexed with a data channel;

FIG. 5 is a block diagram of the two-dimensional despreading unit used in the wireless receiver shown in FIG. 4;

FIG. 6A and FIG. 6B are schematic diagrams illustrating the relation between the data channel and the control channel according to an embodiment of the invention;

FIG. 7 is a block diagram of a wireless transmitter used in the OFDM communication system according to the second embodiment of the invention;

FIG. 8 is a block diagram of a wireless receiver used in the OFDM communication system according to the second embodiment of the invention;

FIG. 9 is a flowchart of a wireless communication method according to an embodiment of the invention;

DETAILED DESCRIPTION OF THE PREFERRED EMBODIMENT

The present invention is described in detail below in conjunction with the attached drawings. It should be noted that the attached drawings depict those components relating to the present invention, among various functional elements structuring a wireless transmitter and a wireless receiver used in OFDM transmission.

Figure 2:
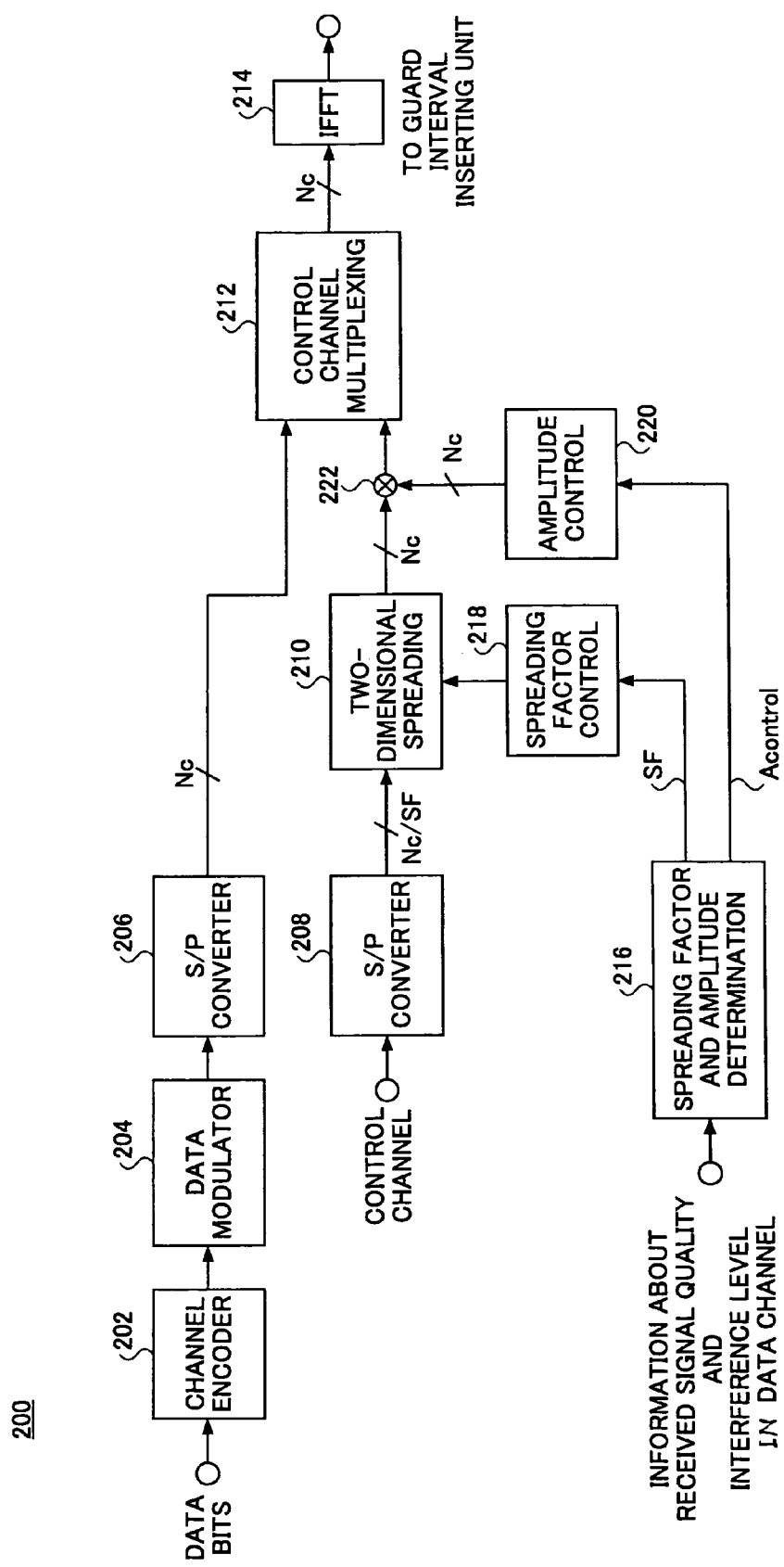
FIG. 2 is a block diagram of a wireless transmitter used in an OFDM communication system according to the first embodiment of the invention.

FIG. 2 is a block diagram of a wireless transmitter 200 used in an OFDM communication system according to the first embodiment of the invention. The wireless transmitter 200 has a channel encoder 202, a data modulator 204, serial to parallel converters (S/P converters) 206 and 208, a two-dimensional spreading unit 210, a control channel multiplexing unit 212, an inverse fast Fourier transform (IFFT) unit 214, a spreading factor and amplitude determination unit 216, a spreading factor control unit 218, and an amplitude control unit 220.

The channel encoder 202 receives a bit stream representing the contents of data, which is to be transmitted by the user in OFDM symbols, and performs appropriate coding on the received bit stream. An example of the coding is error correction coding, such as convolution coding or turbo coding.

The data modulator 204 modulates the appropriately encoded bit stream using a prescribed modulation scheme. Any suitable modulation scheme, such as QPSK, 16-level quadrature amplitude modulation (16 QAM), or 64-level quadrature amplitude modulation (64 QAM), may be used.

The first serial to parallel converter 206 converts a serial modulated bit stream of the user data into parallel bit streams. For the purpose of simplification, the number of parallel bit streams of the user data equals the number Nc of the subcarriers in this embodiment; however, the invention is not limited to this example. The parallel bit streams are supplied to the control channel multiplexing unit 212.

The second serial to parallel converter 208 converts a serial control bit stream representing a control channel (e.g., a pilot channel) into parallel control bit streams. For the purpose of simplification, the number of the parallel control bit streams equals a number (Nc/SF) obtained by dividing the number Nc of the subcarriers by the code spreading factor SF; however, the invention is not limited to this example.

The two-dimensional spreading unit 210 multiplies the parallel control bit streams by a spreading code.

Figure 3:
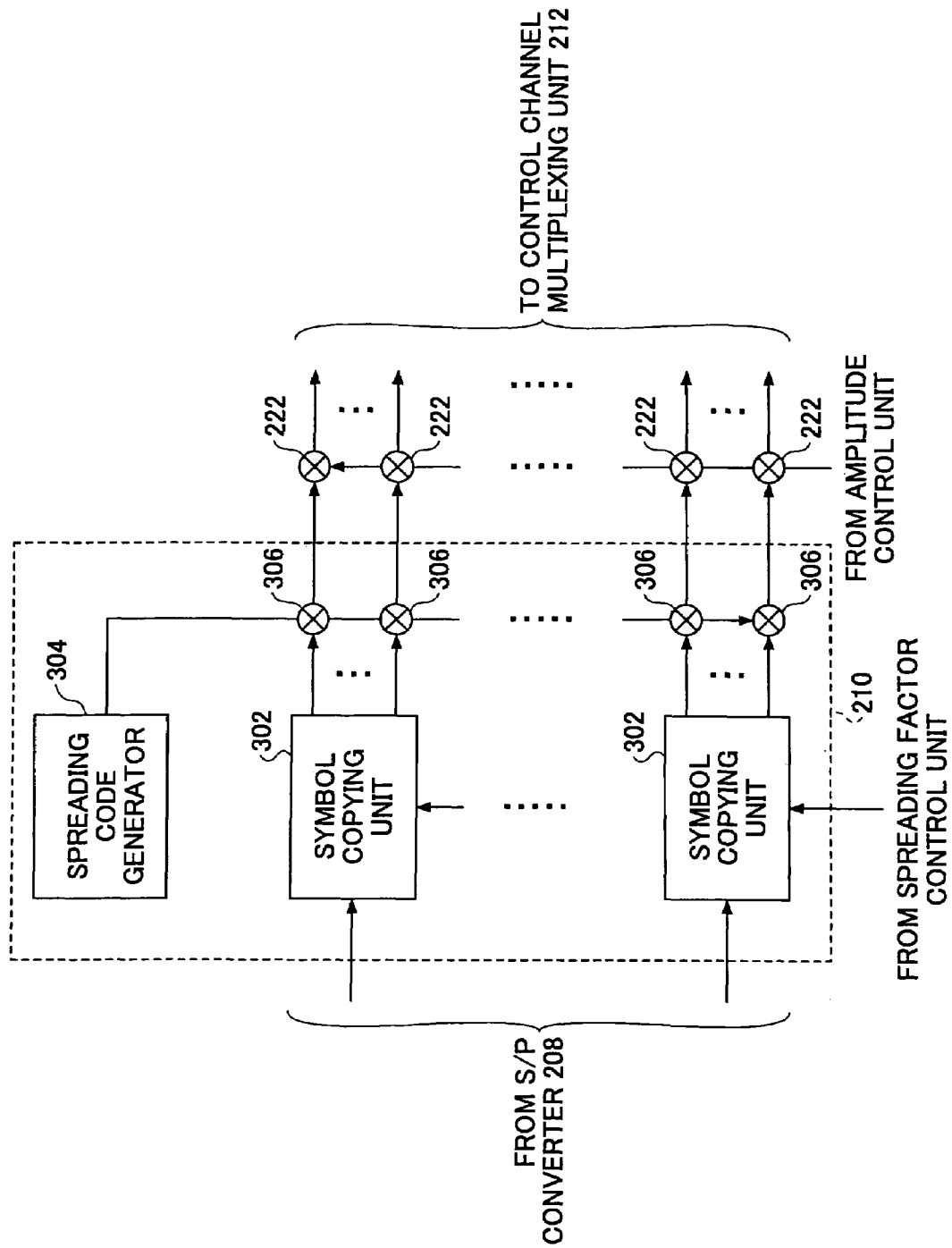
FIG. 3 is a block diagram of the two-dimensional spreading unit used in the wireless transmitter shown in FIG. 2.

FIG. 3 is a block diagram of the two-dimensional spreading unit 210 used in the wireless transmitter 200 shown in FIG. 2. The two-dimensional spreading unit 210 performs code spreading using a Multi-Carrier Code Division Multiple Access (MC-CDMA) scheme. The two-dimensional spreading unit 210 includes symbol copying units 302 corresponding to the parallel bit streams, a spreading code generator 304, and spreading code multipliers 306. MC-CDMA is also referred to as OFCDM (Orthogonal Frequency and Code Division Multiplexing).

Each of the symbol copying units 302 produces a prescribed number (equal to the spreading factor SF, for example) of parallel control bit streams from one of the parallel bit streams supplied from the second S/P converter 208. Each of the copied control bit streams output from the symbol copying unit 302 is connected to one of the input terminals of the associated spreading code multiplier 306. A spreading code generated by the spreading code generator 304 is supplied to the other input terminal of each of the spreading code multipliers 306. Each of the spreading code multipliers 306 multiplies the control bit streams by the spreading code to perform code spreading on the control bit stream. The amplitude level of the code-spread control bit stream is appropriately regulated at the multiplier 222, and the amplitude-adjusted bit stream is supplied to the control channel multiplexing unit 212.

Returning to FIG. 2, the spreading factor and amplitude determination unit 216 acquires, monitors, or estimates information about the signal quality required in the current wireless communication, the interference level of the data channel due to the control channel, and other necessary information. Based on the acquired information, the spreading factor and the amplitude for the control channel are determined, and the determination results are supplied to the spreading code control unit 218 and the amplitude control unit 220, respectively.

Figure 10:
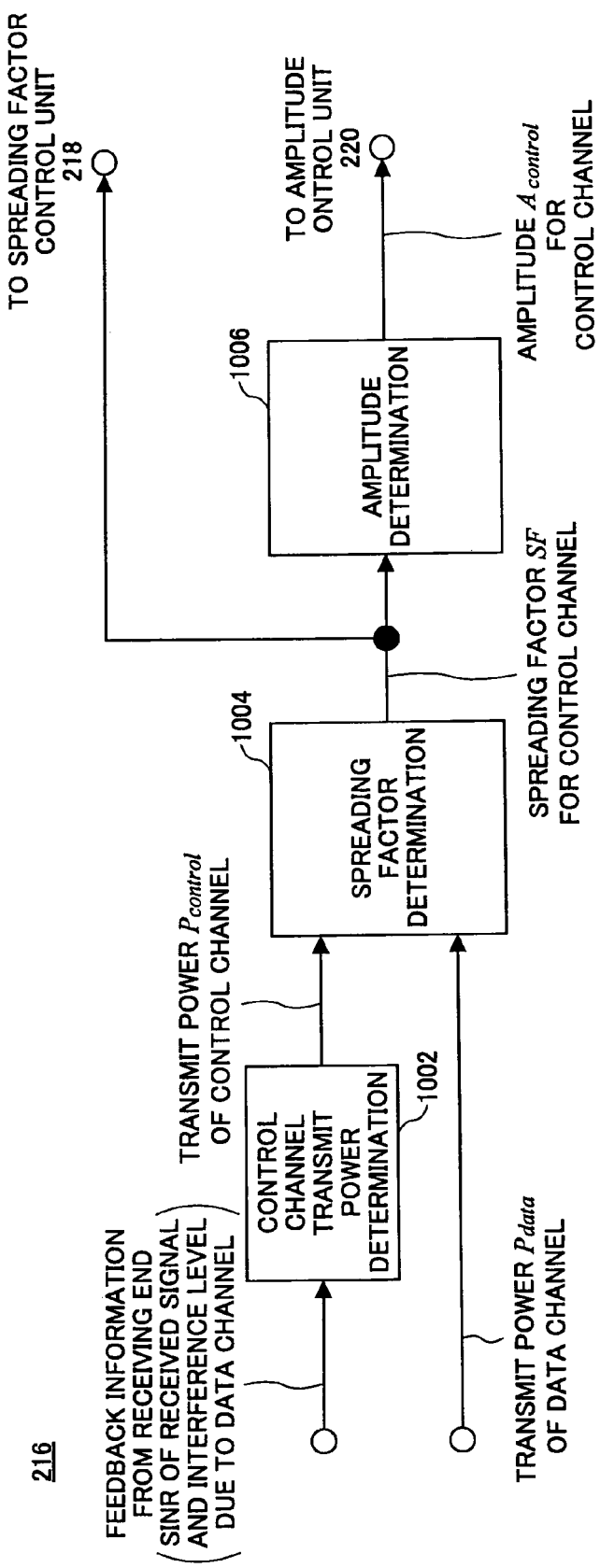
FIG. 10 is a block diagram of the spreading factor and amplitude determination unit used in the wireless transmitter.

FIG. 10 is a block diagram of the spreading factor and amplitude determination unit 216. The spreading factor and amplitude determination unit 216 includes a control channel transmit power determination unit 1002, a spreading factor determination unit 1004, and an amplitude determination unit 1006.

The control channel transmit power determination unit 1002 determines a transmit power $P_{control}$, which power is assigned to a non-spread control channel when the non-spread control channel is to be transmitted. This transmit power corresponds to the power of the output signal from the two-dimensional spreading nit 210 shown in FIG. 2, and is determined based on the feedback information supplied from a wireless receiver, as will be described below. The feedback information includes the signal quality (such as SINR) of the signal received at the wireless receiver, and the interference level of the data channel due to the control channel. The transmit power $P_{control}$ of the control channel may be calculated from formula (1).

$$P_{control} > \alpha * [(\text{interference level in data channel}) + (\text{noise component})] \quad (1)$$

where the noise component is estimated from the SINR of the receiving end, and α is a prescribed scaling factor having a fixed value. The calculated transmit power $P_{control}$ is supplied to the spreading factor determination unit 1004.

The spreading factor determination unit 1004 determines the spreading factor SF such that the ratio of the transmit power ($P_{control}$/SF) of the spread control channel to the data channel transmit power $P_{data}$ does not exceed a prescribed threshold value Th. The threshold value Th may be a fixed values, or a variable value dynamically determined based on the received SINR contained in the feedback information. This relation is expressed as $$(P_{control}/SF)/P_{data} < Th. \quad (2)$$

The calculated spreading factor is supplied to the amplitude determination unit 1006 and the spreading factor control unit 218 shown in FIG. 2.

The amplitude determination unit 1006 determines the amplitude $A_{control}$ so as to realize transmit power ($P_{control}$/SF) of the post-spreading control channel determined according to expression (2). In general, the power of a signal is in proportion to the square of the amplitude, and therefore, the amplitude may be determined from $$A_{control} = (P_{control}/SF)^{1/2}. \quad (3)$$

The determined amplitude is supplied to the amplitude control unit 220.

Figure 11:
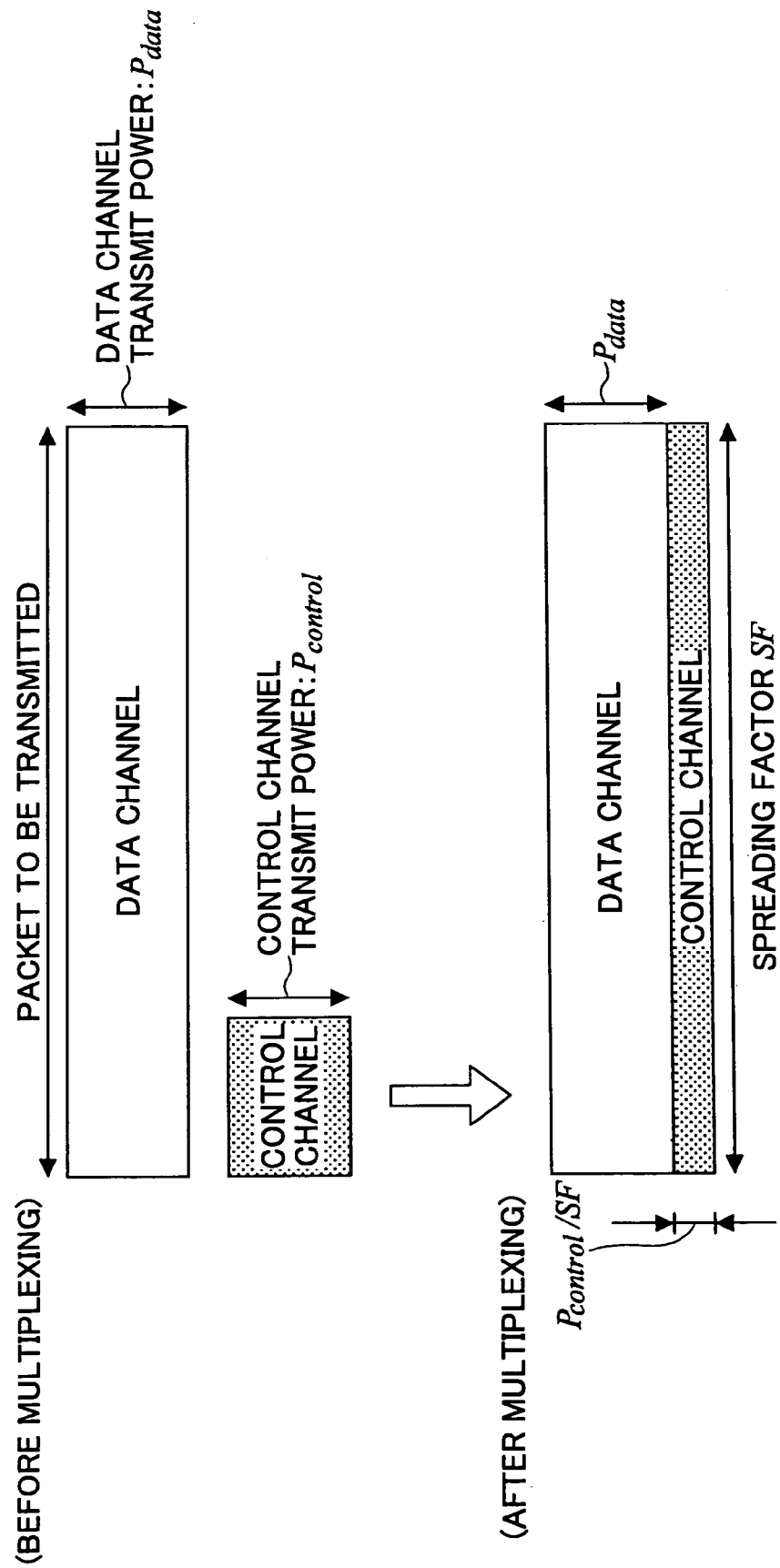
FIG. 11 is a schematic diagram illustrating the relation between the transmit power of the data channel and that of the control channel before and after multiplexing.

FIG. 11 schematically illustrates the relation between the control channel transmit power $P_{control}$ and the data channel transmit $P_{data}$ before and after spreading. In this embodiment, the control channel is inserted in a continuous manner along the frequency axis. In FIG. 11, the vertical axis corresponds to power, and the horizontal axis corresponds to frequency. By setting the power level of each channel in the above-described manner, the interference influence on the data channel due to the control channel can be maintained below the threshold Th.

Returning again to FIG. 2, the spreading factor control unit 218 generates a control signal for setting an appropriate spreading factor based on the information supplied from the spreading factor and amplitude determination unit 216, and supplies the control signal to the two-dimensional spreading unit 210 (more specifically, to the symbol copying units 302). A target value of the spreading factor SF ("target SF") is input to the spreading factor control unit 218, and the control signal is generated so as to realize the target SF.

The amplitude control unit 220 generates a control signal for setting an appropriate amplitude level or power level based on the information supplied from the spreading factor and amplitude determination unit 216, and supplies the control signal to the multiplier 222. A target $A_{control}$ is supplied to the amplitude control unit 220, and the control signal is generated so as to realize the target $A_{control}$.

The control channel multiplexing unit 212 adds parallel bit streams of user data supplied from the first serial to parallel converter 206 to the code-spread parallel bit streams of the control channel for the respective subcarriers, and outputs Nc bit streams. The Nc bit streams comprise corresponding multiplexed user data and code-spread bit streams of the control channel.

The inverse fast Fourier transform (IFFT) unit 214 performs inverse fast Fourier transform on the Nc bit streams to convert the information associated with the subcarriers to time-domain bit streams. The time-domain bit streams are supplied to the RF unit (not shown) that includes a band-limiting processing unit, a frequency converter, and a power amplifier, and transmitted from an antenna.

Figure 4:
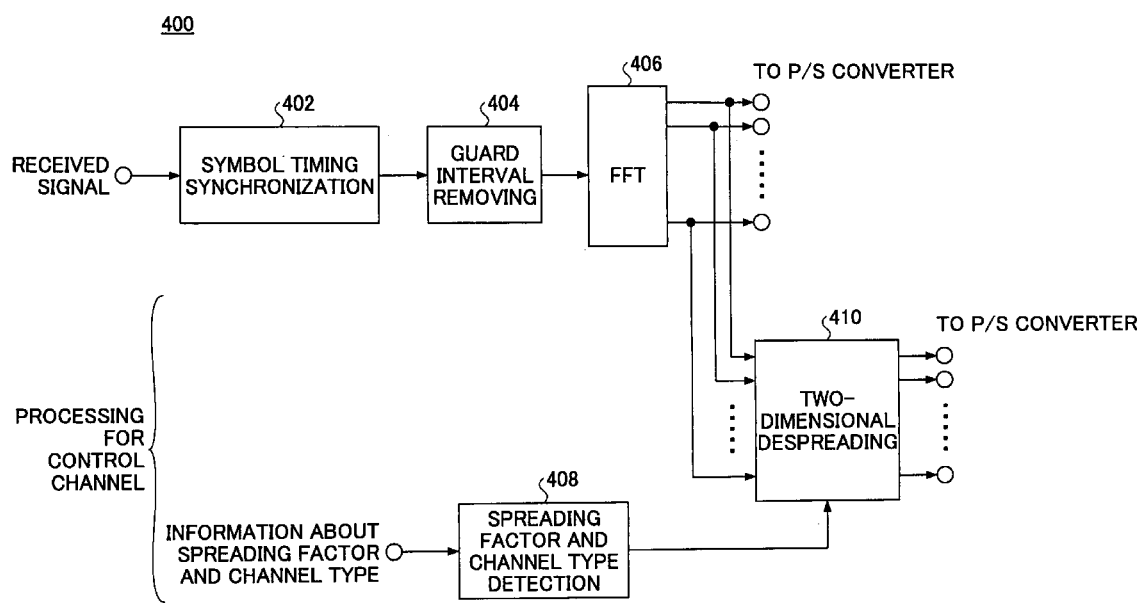
FIG. 4 is a block diagram of a wireless receiver used in the OFDM communication system according to the first embodiment of the invention.

FIG. 4 is a block diagram of a wireless receiver 400 used in the OFDM communication system according to the first embodiment of the invention. The wireless receiver 400 has a symbol timing synchronizing unit 402, a guard interval removing unit 404, a fast Fourier transform (FFT) unit 406, a spreading factor and channel type detection unit 408, and a two-dimensional despreading unit 410.

The symbol timing synchronizing unit 402 takes synchronization based on the received OFDM symbols to guarantee appropriate timing. The guard interval removing unit 404 removes the guard interval from the received OFDM symbols, and extracts the subsequent remaining portion. The fast Fourier transform unit 406 performs fast Fourier transform, and outputs information having been transmitted on the respective subcarriers. Then, appropriate processes are carried out (by those components not shown in FIG. 4) to recover the transmitted information.

The two-dimensional despreading unit 410 multiplies the Fourier-transformed parallel bit streams by an appropriate spreading code to despread the received bit streams. In this case, the spreading factor and channel type detection unit 408 supplies information about the spreading factor of the spreading code to the two-dimensional dispreading unit 410, and determines what types of code-spread information are currently being processed. For example, only a pilot channel may be code-spread in the control channel, and the other channels may be transmitted using another scheme, without spreading. The information about the spreading factor and the channel type is acquired from the wireless transmitter.

FIG. 5 is a block diagram of the two-dimensional despreading unit 410. The two-dimensional despreading unit 410 performs despreading based on the MC-CDMA scheme, and includes a spreading code generator 502, spreading code multipliers 504, and symbol combining units 506. Each of the bit streams supplied from the FFT unit 406, the number of which streams equals, for example, the number Nc of subcarriers, is supplied to one of the input terminals of one of the spreading code multipliers 504. A spreading code generated by the spreading code generator 502 is supplied to the other input of the multipliers 504. Each of the spreading code multipliers 504 multiplies the associated bit stream by the spreading code to extract the control bit stream through despreading. Each of the symbol combining units 506 combines the prescribed number of bit streams (corresponding to the spreading factor SF, for example) into a bit stream. Then, the control channel is recovered through the subsequent processes (not shown).

FIG. 9 is a flowchart showing the multiplexing and separation of the control channel and the data channel according to the embodiment of the invention. The data channel is a bit stream of data containing ordinary OFDM symbols, and the control channel is a code-spread bit stream based on the MC-CDMA scheme. The control channel and the data channel are added to each other by the control channel multiplexing unit 212 of the wireless transmitter 200 (step 904). The multiplexed (or added) signal is modulated by the IFFT unit 214, subjected to application of a guard interval, and transmitted as OFDM symbols from the antenna (step 906). Since the control channel has been code-spread, the spectrum of the multiplexed signal in the frequency domain becomes as shown in FIG. 6A. This spectrum is greatly different from that shown in FIG. 1A illustrating the conventional multiplexing of the data channel and the non-spread control channel.

The wireless receiver 400 identifies the control channel and the data channel from the received signal, and recovers these channels (step 908). When recovering the data channel at the wireless receiver, the control channel is treated as noise. Because the noise has a low amplitude level over a wide range of the frequency domain, as illustrated in FIG. 6A, the recovery of the data channel is not prevented by the noise. In other words, the spreading factor and amplitude determination unit 216 of the wireless transmitter 200 determines the spreading factor SF and the amplitude $A_{control}$ for the control channel to be transmitted such that the code-spread control channel does not prevent recovery of the data channel. The determined values are reported to the spreading factor control unit 218 and the amplitude control unit 220, respectively, so as to appropriately regulate the spreading factor SF and the amplitude $P_{control}$ (or the transmit power) for the channel currently being processed. The information about the spreading factor may be transmitted to the wireless receiver 400 via a non-coded channel, such as a broadcast control channel, by using a part of the data channel, or by any suitable means, as long as information required for recovery of the transmitted information can be used by the wireless receiver 400.

Because the control channel is inserted over the entire range of the frequency domain, an instantaneously changing signal due to an abrupt change in amplitude level along the frequency axis or fading can be followed accurately over the entire range. In addition, since the control channel can be distinguished from the data channel based on whether the channel is spread by a spreading code, it is unnecessary to allocate a dedicated channel to the control channel. Consequently, the resources that have been allocated exclusively to the control channel in the conventional technique can be assigned to the data channel. Within the control channel, only the pilot channel may be code-spread.

FIG. 7 is a block diagram of a wireless transmitter 700 used in the OFDM communication system according to the second embodiment of the invention. The wireless transmitter 700 has a channel encoder 702, a data modulator 704, a serial to parallel converter (S/P converter) 706, an inverse fast Fourier transform (IFFT) unit 708, a spreading unit 710, a control channel multiplexing unit 712, a spreading factor and amplitude determination unit 716, a spreading factor control unit 718, an amplitude control unit 720, and a multiplier 722.

The channel encoder 702 receives a bit stream representing the contents of data, which is to be transmitted by the user in OFDM symbols, and performs appropriate coding on the received bit stream. An example of the coding is error correction coding, such as convolution coding or turbo coding.

The data modulator 704 modulates the appropriately encoded bit stream using a prescribed modulation scheme. The serial to parallel converter 706 converts a serial modulated bit stream of the user data into as many parallel bit streams as the number Nc of the subcarriers. The parallel bit streams are supplied to the IFFT unit 708.

The IFFT unit 708 performs inverse fast Fourier transform on Nc bit streams to convert the user data to be carried on the subcarriers into time-domain bit streams. The time-domain bit streams are supplied to the control channel multiplexing unit 712.

The spreading unit 710 multiplies the control bit stream by a spreading code. The spreading unit 710 performs code spreading using a Direct Sequence-Code Division Multiple Access (DS-CDMA) scheme. The spreading unit 710 includes a spreading code generator (not shown) and a spreading code multiplier (not shown). The code-spread control bit stream is supplied to the multiplier 722 for appropriate adjustment of the amplitude level, and then input to the control channel multiplexing unit 712.

The spreading factor and amplitude determination unit 716 acquires, monitors, or estimates information about the signal quality required in the current wireless communication, the interference level in the data channel due to the control channel, and other necessary information. The spreading factor and the amplitude of the control channel determined based on the acquired information are supplied to the spreading code control unit 718 and the amplitude control unit 720, respectively. The spreading factor and amplitude determination unit 716 may have the same structure as that described in the first embodiment with reference to FIG. 10. However, in the second embodiment, the control channel is inserted continuously along the time axis, unlike the first embodiment in which the control channel is inserted along the frequency axis.

The spreading factor control unit 718 generates a control signal for setting an appropriate spreading factor based on the information supplied from the spreading factor and amplitude determination unit 716, and supplies the control signal to the spreading unit 710. The amplitude control unit 720 generates a control signal for setting an appropriate amplitude level or power level based on the information supplied from the spreading factor and amplitude determination unit 716, and supplies the control signal to the multiplier 722.

The control channel multiplexing unit 712 adds the parallel bit streams of user data supplied from the IFFT unit 708 to the code-spread bit stream of the control channel, and outputs a multiplexed bit stream combining user data stream with the spread control bit stream. This bit stream is then subjected to application of a guard interval, supplied to an RF unit (not shown) that includes a band-limiting processing unit, a frequency converter, and a power amplifier, and transmitted from the antenna.

FIG. 8 is a block diagram of a wireless receiver 800 used in the OFDM communication system according to the second embodiment of the invention. The wireless receiver 800 has a symbol timing synchronizing unit 802, a guard interval removing unit 804, a fast Fourier transform (FFT) unit 806, a rake combining unit 808, a path search unit 810, a channel estimation unit 812, and a spreading factor and channel type detection unit 814.

The symbol timing synchronizing unit 802 takes synchronization based on the received OFDM symbols to guarantee appropriate timing. The guard interval removing unit 804 removes the guard interval from the received OFDM symbols, and extract the subsequent remaining portion. The fast Fourier transform (FFT) unit 806 performs fast Fourier transform, and outputs information having been transmitted on the respective subcarriers. Then, appropriate processes are carried out (by those components not shown in FIG. 8) to recover the transmitted information.

The received OFDM symbols are also input to the rake combining unit 808 and the path search unit 810. The path search unit 810 detects timings of multiple propagation paths of the received OFDM symbols. The channel estimation unit 812 supplies a control signal for compensating for fading fluctuation in each path to the rake combining unit 808. The spreading factor and channel type detection unit 814 supplies information about the spreading factor of the spreading code to the rake combining unit 808, and determines what types of code-spread information are currently being processed. The rake combining unit 808 combines the signals from the respective multiple paths, while compensating for the influence of fading on each path based on the control signal. As a result, an appropriately despread control bit stream can be obtained for the control channel. Based on the control bit stream, the control channel transmitted from the wireless transmitter 700 is recovered by the subsequent components (not shown).

Next, explanation is made of multiplexing and separation of the control channel and the data channel. The basic procedure is the same as that already explained in conjunction with FIG. 9. In the second embodiment, the data channel is a bit stream of user data containing ordinary OFDM symbols, while the control channel is a code-spread bit stream based on a DS-CDMA scheme. The data channel and the control channel are added to each other at the control channel multiplexing unit 712. The multiplexed bit stream is subjected to application of a guard interval, and transmitted as OFDM symbols from the antenna. Since the control channel is code-spread in the time domain, the time-domain spectrum of the signal to be transmitted becomes as shown in FIG. 6B, which is greatly different the time-domain spectrum of the conventional technique shown in FIG. 1B.

When recovering the data channel at the wireless receiver 800, the control channel is treated as noise. The noise has a low amplitude level over the entire section of the frame, as illustrated in FIG. 6B, and accordingly, recovery of the data channel is not prevented by the noise. In other words, the spreading factor control unit 718 and the amplitude control unit 720 appropriately adjust the spreading factor and the amplitude (or the power) such that the control channel does not prevent recovery of the data channel.

In the second embodiment, the control channel is inserted continuously over the entire frame of the time domain. (In the first embodiment, the control channel is inserted continuously over the entire range of the frequency domain.) An instantaneously changing signal due to an abrupt change in amplitude level along the time axis or fading can be followed accurately over the entire frame. In addition, because the control channel can be distinguished from the data channel based on whether the channel is spread by a spreading code, it is unnecessary to allocate a dedicated channel to the control channel. Consequently, the resources that have been allocated exclusively to the control channel in the conventional technique can be assigned to the data channel. Within the control channel, only the pilot channel may be code-spread.

In the first and second embodiments (for spreading the control channel in the frequency domain and the time domain, respectively), it is also technically possible to spread the data channel. Such an arrangement is advantageous when a number of cells define a wide range of a service area. With a CDMA scheme, all the signals not addressed to own station become noise. Such noise includes interference within the cell and interference from adjacent cells. If the data channel is being code-spread, interference form adjacent cells can be reduced efficiently during extraction of the data channel. Accordingly, in such a communication environment, spreading of the data channel is advantageous.

However, there are some environments in which interference from other cells does not have to be considered. For example, a cell or a service area is provided as a spot or an isolated cell. If the data channel is spread in such an environment, interference within the cell increases due to interference between the spreading code of the control channel and the spreading code of the data channel. This may result in an undesirable limitation of resources for the data channel. Accordingly, it is advantageous for a wireless communication system defining isolated cells to transmit the data channel as ordinary OFDM symbols, without code spreading, while spreading the control channel. The wireless transmitter described in the first and second embodiments can be advantageously applied to a wireless base station of an isolated cell so as to allow the data channel to be multiplexed with a code-spread pilot channel.

This patent application is based on and claims the benefit of the earlier filing dates of Japanese Patent Application No. 2004-018772 filed Jan. 27, 2004, the entire contents of which are hereby incorporated by reference.

What is claimed is:

1. A wireless communication system employing an orthogonal frequency division multiplexing (OFDM) scheme, including a transmitter and a receiver, wherein the transmitter comprises:

a determination unit configured to determine a spreading factor and an amplitude for a control channel based on at least one of signal quality information and interference information in data transmission;

a multiplexing unit configured to multiplex a data channel with the control channel having been code-spread based on the spreading factor and the amplitude; and means for modulating the multiplexed signal in the OFDM scheme and transmitting the modulated signal as OFDM symbols; and wherein the receiver includes means for demodulating the OFDM symbols and despreading the demodulated symbols to extract the control channel.

2. A transmitter used in a wireless communication system based on an orthogonal frequency division multiplexing (OFDM) scheme, comprising:

a determination unit configured to determine a spreading factor and an amplitude for a control channel based on at least one of signal quality information and interference information in data transmission;

a multiplexing unit configured to multiplex a data channel with the control channel having been code-spread based on the spreading factor and the amplitude; and means for modulating the multiplexed signal in the OFDM scheme and transmitting the modulated signal as OFDM symbols.

3. The transmitter of claim 2, further comprising:

a spreading unit configured to code-spread the control channel in a multi-carrier code division multiple access (MC-CDMA) scheme.

4. The transmitter of claim 2, further comprising:

a spreading unit configured to code-spread the control channel in a direct sequence-code division multiple access (DS-CDMA) scheme.

5. The transmitter of claim 2, being applied to a wireless base station in an isolated cell.

6. The transmitter of claim 2, wherein the determination unit controls the spreading factor and the amplitude such that the influence of the control channel on the data channel is smaller than a prescribed level.

7. The transmitter of claim 6, wherein information representing the spreading factor and the amplitude of the code-spread control channel is transmitted.

8. A receiver used in a wireless communication system based on an orthogonal frequency division multiplexing (OFDM) scheme, comprising:

a detection unit configured to detect a spreading factor and a channel type of a code-spread control channel from a received signal, the received signal being a data channel and the control channel multiplexed together; and control channel recovery means for recovering the control channel from the received signal based on the spreading factor and the channel type.

9. A wireless communication method based on an orthogonal frequency division multiplexing (OFDM) scheme comprising the steps of:

determining a spreading factor and an amplitude for a control channel to be transmitted based on signal quality information and interference level in data transmission;

multiplexing a data channel with a control channel having been code-spread using the determined spreading factor and amplitude;

modulating the multiplexed signal in the OFDM scheme;

transmitting the modulated signal;

demodulating the transmitted signal in the OFDM scheme at a receiver; and despreading the demodulated signal to extract the control channel.

* * * * *